United States Patent
Edelstein

(10) Patent No.: US 8,249,820 B2
(45) Date of Patent: Aug. 21, 2012

(54) DETECTOR ASSEMBLY FOR USE IN ENVIRONMENTS CONTAINING BACKGROUND MAGNETIC NOISE AND METHOD THEREOF

(75) Inventor: Alan S. Edelstein, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/829,712

(22) Filed: Jul. 2, 2010

(65) Prior Publication Data

US 2012/0004878 A1    Jan. 5, 2012

(51) Int. Cl.
*G01R 23/16* (2006.01)
(52) U.S. Cl. .......................................... 702/77
(58) Field of Classification Search ............... 702/77
See application file for complete search history.

(56) References Cited

U.S. PATENT DOCUMENTS

| | | | |
|---|---|---|---|
| 4,675,606 A * | 6/1987 | Ganguly | 324/244 |
| 4,680,545 A | 7/1987 | Gray et al. | |
| 5,367,259 A | 11/1994 | Matsumoto et al. | |
| 6,462,540 B1 | 10/2002 | Kandori et al. | |
| 2004/0080316 A1 * | 4/2004 | Friend et al. | 324/244 |

OTHER PUBLICATIONS

Bick, et al., SQUID gradiometry for magnetocardiography using different noise cancellation techniques, IEEE Trans. Appl. Supercond., vol. 11, No. 1, pp. 673-676 (2001).

* cited by examiner

*Primary Examiner* — Aditya Bhat
(74) *Attorney, Agent, or Firm* — Lawrence E. Anderson

(57) ABSTRACT

A method and system for detecting a signal source at a specified frequency in the presence of background noise includes a processor; a first sensor mounted at a first location operatively connected to the processor; a second sensor mounted at a second location operatively connected to the processor; the processor operating to compute the amplitudes of the first and second Fourier transforms of the outputs of the first and second sensors, respectively, the difference in the amplitudes of the first and second Fourier transforms being determinative of the existence of a signal being generated at the predetermined frequency.

20 Claims, 5 Drawing Sheets

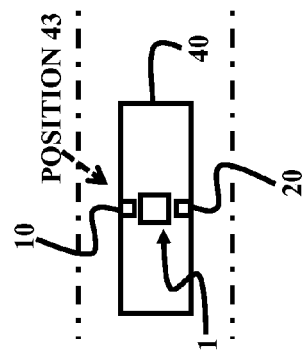
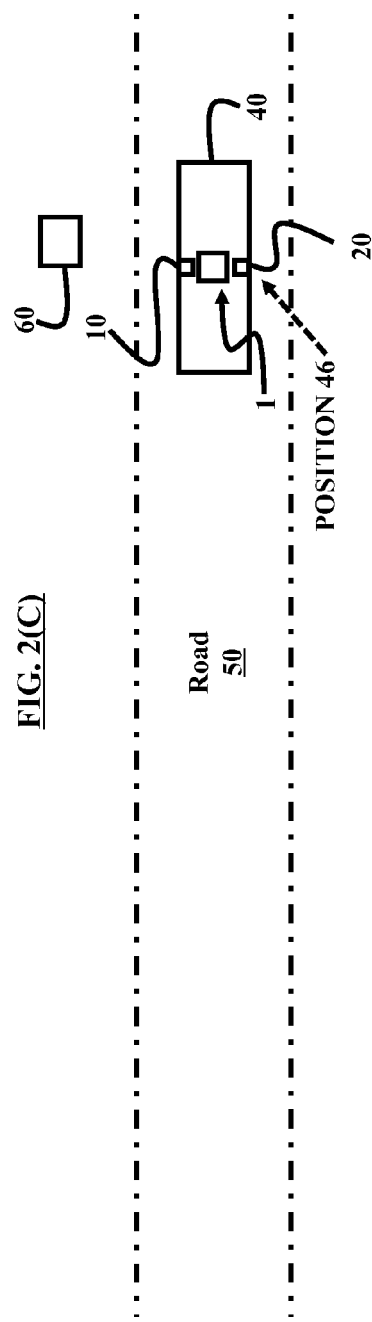

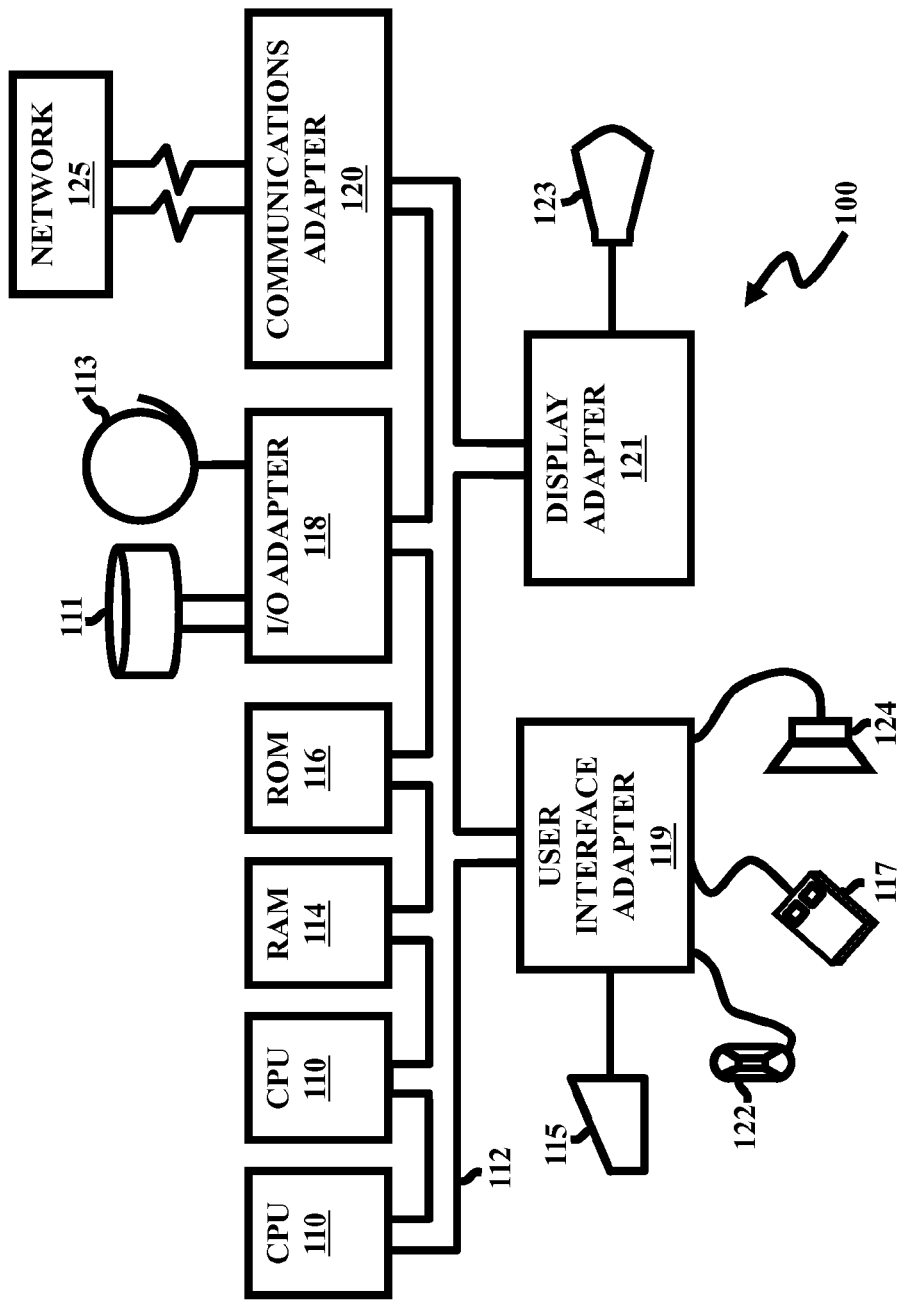

DETECTOR ASSEMBLY FOR USE IN ENVIRONMENTS CONTAINING BACKGROUND MAGNETIC NOISE AND METHOD THEREOF

GOVERNMENT INTEREST

The embodiments herein may be manufactured, used, and/or licensed by or for the United States Government without the payment of royalties thereon.

BACKGROUND

Description of the Related Art

There are many potential military and commercial applications for an improved magnetic sensing system that can more effectively and rapidly detect the presence of an electromagnetic field, magnetic object, or a target. For example, all types of land vehicles, ships, and aircraft have structural and power systems capable of generating substantial magnetic signatures. Even small, inert objects may exhibit sufficient magnetization to be observed from a distance.

Magnetoresistive sensor technology has the capability of producing low cost magnetic sensors. Magnetic sensors or transducers are generally passive sensors with desirable attributes for several types of applications that include insensitivity to weather conditions, the requirement of only a small bandwidth, and the unique ability to "see through" walls and foliage without attenuation. Furthermore, in military applications it is generally difficult to make a weapon or vehicle that does not include ferrous material that can be detected by magnetic sensors. Though the permanent magnetic moment of the ferrous material can be minimized by "deperming," which is a process of reduction of permanent magnetism, the distortion of the earth's magnetic field due to the magnetic permeability is typically difficult to hide. Data from magnetic sensors can be combined with the data from other sensor modalities such as acoustic and seismic sensors to characterize or identify and track targets. Specifically, in military applications magnetic sensors can be used for perimeter defense, at check points, as part of a suite of sensors in unattended ground sensor networks, and on unmanned ground vehicles (UGVs) and unmanned air vehicles (UAVs). Moreover, magnetic sensors or transducers can also be employed to monitor rooms and passageways that have been cleared by military personnel.

The magnetic signals from military targets come from the internal motion of ferromagnetic parts, electrical currents, and the motion of targets containing ferromagnetic material relative to the magnetic sensor. The latter can arise either from the motion of the target or the sensor. All of these magnetic signals often occur at low frequencies, typically less than 100 Hz. Because of background generation of magnetic fields, it is generally difficult to detect the magnetic signals that occur at low frequencies.

Conventional magnetic sensing systems, however, are ill-suited for detecting specific frequencies (e.g., magnetic signatures) in environments with excessive background magnetic noise. In addition, conventional systems are generally unable to detect a specific frequency when the magnetic noise in the environment includes the frequency. With a limited capacity to provide highly selective frequency detection, mobile magnetic sensing systems (e.g., mounted to a motorized vehicle) typically become inoperable and impractical due to excessive magnetic noise associated with the surrounding environment.

As used herein, the term type of geophysical instrument used for magnetic surveys in which a pair of magnetometers are normally mounted one above the other on a single support staff. Various kinds are available, but the most commonly used in archaeology is the fluxgate gradiometer with the direction-responsive sensors between 0.5 m and 2.0 m apart. This measures the gradient in a magnetic field and will detect shallowly buried features and structures. The use of dual sensors overcomes many of the problems associated with single-sensor instruments, for example variations in the strength of the Earth's magnetic field and deep-seated geological anomalies. By systematically scanning an area on a grid system and logging the readings at close intervals it is possible to build up detailed plots showing the shape and form of the archaeological anomalies. These can be used to propose the nature and extent of buried features.

SUMMARY

In view of the foregoing, a preferred embodiment provides a system for detecting a signal source (which may be at a specified frequency) whether or not background noise is present. The preferred embodiment comprises an assembly 30 having at least two spaced apart sensors/receivers 10, 20 for receiving signals from a potential target area, a gradiometer comprising a first magnetometer coupled to a first receiver and producing first signal information; and a second magnetometer coupled to a second receiver and producing second signal information; and a processor for processing information from the first and second sensors/receivers 10, 20. As used herein, the terminology processor means digital signal processor, computer, personal computer, laptop, CPU, multiprocessor, microprocessor, multiple processors, multi-processors, general purpose computer, or the like. As used herein, the terminology assembly (such as assembly 30) means an operative association of components and is not intended to imply a necessary physical association or connection, although the components may be physically connected.

The preferred embodiment assembly 30 may be vehicle mounted and the first and second sensors/receivers 10, 20 may be positioned on opposites sides of the vehicle. Optionally, the sensors may be remotely positioned and transmit wirelessly or by a connector to a processor 38 which is remotely located.

The processor may comprise, or have associated therewith, an analog to digital converter (A/D converter) whereby the signal information from the respective sensors 10, 20 is converted to a digitized output in a narrow band around a frequency $f_o$. The A/D converter 32 produces a digital output from analog input.

In addition, the assembly 30 may comprise a Fourier transform unit 34 which computes a first Fourier transform for the signal SIG1 from sensor 10 in a narrow band around frequency $f_0$ and a second Fourier transform for the signal SIG2 from sensor 20 in a narrow band around frequency $f_0$. Moreover, the assembly 30 may comprise a ratio unit coupled to the Fourier transform unit for outputting a ratio of the amplitudes of the first and second signal Fourier transforms at the specified frequency.

Furthermore, the assembly 30 comprises a processor 38. In a preferred embodiment, the processor 38 computes the amplitudes $S_1$ & $S_2$ which are the Fourier transforms of the signals of the sensors 10 and 20 at the frequency $f_0$. The difference in amplitudes is $S_1 - cS_2$, where $S_1$ is input derived from the first sensor 10, $S_2$ is input derived from the second sensor 20, and c is the input from the ratio unit 36. Optionally, the processor 38 may convert the signal from analog to digital, compute the ratio and/or the Fourier transforms without departing from the scope of the present invention.

For calibration purposes, the test signal generator 40 may comprise a signal generator and coil system, wherein the signal generator and coil system emits a signal at the specified frequency and is positioned symmetrically relative to the first sensor 10 (or magnetometer) and the second sensor 20 (or magnetometer). The test signal generator may be a conventional appliance, broadcast source, signal generator or the like. Upon reception of the test signal, the processor 38 computes a sensitivity of said first magnetometer and said second magnetometer and computes c.

A preferred embodiment for detecting an object emitting a specific frequency in an environment with magnet noise also being emitted at the specific frequency may comprise first and second gradiometers producing first and second signal information respectively, and a processor for processing the first and second signal information and computing first and second Fourier transforms of the first and second information signals, respectively. In such an apparatus, the processor may determine a first amplitude from the first Fourier transform of the first information signal and a second amplitude from the second Fourier transform of the second information signal at the specified frequency. Moreover, the processor may calculate a ratio of the first amplitude and the second amplitude at the specified frequency. Furthermore, the processor may compute $S_1 - cS_2$, where $S_1$ is the first signal information, $S_2$ is the second signal information, and c is the ratio at the specified frequency and is a fixed constant.

Another embodiment herein provides a method of detecting a specific frequency in an environment with magnet noise emitting the specific frequency, the method comprising capturing first signal information; capturing second signal information; computing a first amplitude comprising calculating a first Fourier transform of the first signal information; computing a second amplitude comprising calculating a second Fourier transform of the second signal information; computing a ratio of the first amplitude to the second amplitude; calculating $S_1 - cS_2$, where $S_1$ is the first signal information, $S_2$ is the second signal information, and c is the inverse ratio and is a fixed constant; and outputting the result.

In such a method, the processor 38 may detect a known or unknown object at the specific frequency when the calculation $S_1 - cS_2$ produces a non-zero value, and wherein an object is not detected when $S_1 - cS_2$ produces a zero value. In addition, the signal information may be captured using first and second magnetometers. Furthermore, when the computation $S_1 - cS_2$ is greater than zero, this may indicate that the source 60 is emitting the fixed frequency closer to the first magnetometer 10 compared to the second magnetometer 20, and wherein when the computation $S_1 - cS_2$ is less than zero, such a method may indicate the source 60 is emitting the fixed frequency closer to the second magnetometer 20 compared to the first magnetometer, and wherein when both $S_1$ and $S_2$ increase, and the computation $S_1 - cS_2$ is near zero, such a method may indicate the source is emitting the fixed frequency that is equidistant the first magnetometer and the second magnetometer. Moreover, the first magnetometer 10 and the second magnetometer may be components of a gradiometer. Additionally, the capturing of the first and second signal information may be done over a period of time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 2(A) through 2(C) illustrate a schematic diagram of a signal detection apparatus coupled to a vehicle according to an embodiment herein;

FIG. 4 illustrates a schematic diagram of a computer architecture used in accordance with the embodiments herein.

DETAILED DESCRIPTION OF PREFERRED EMBODIMENTS

Figure 1A:
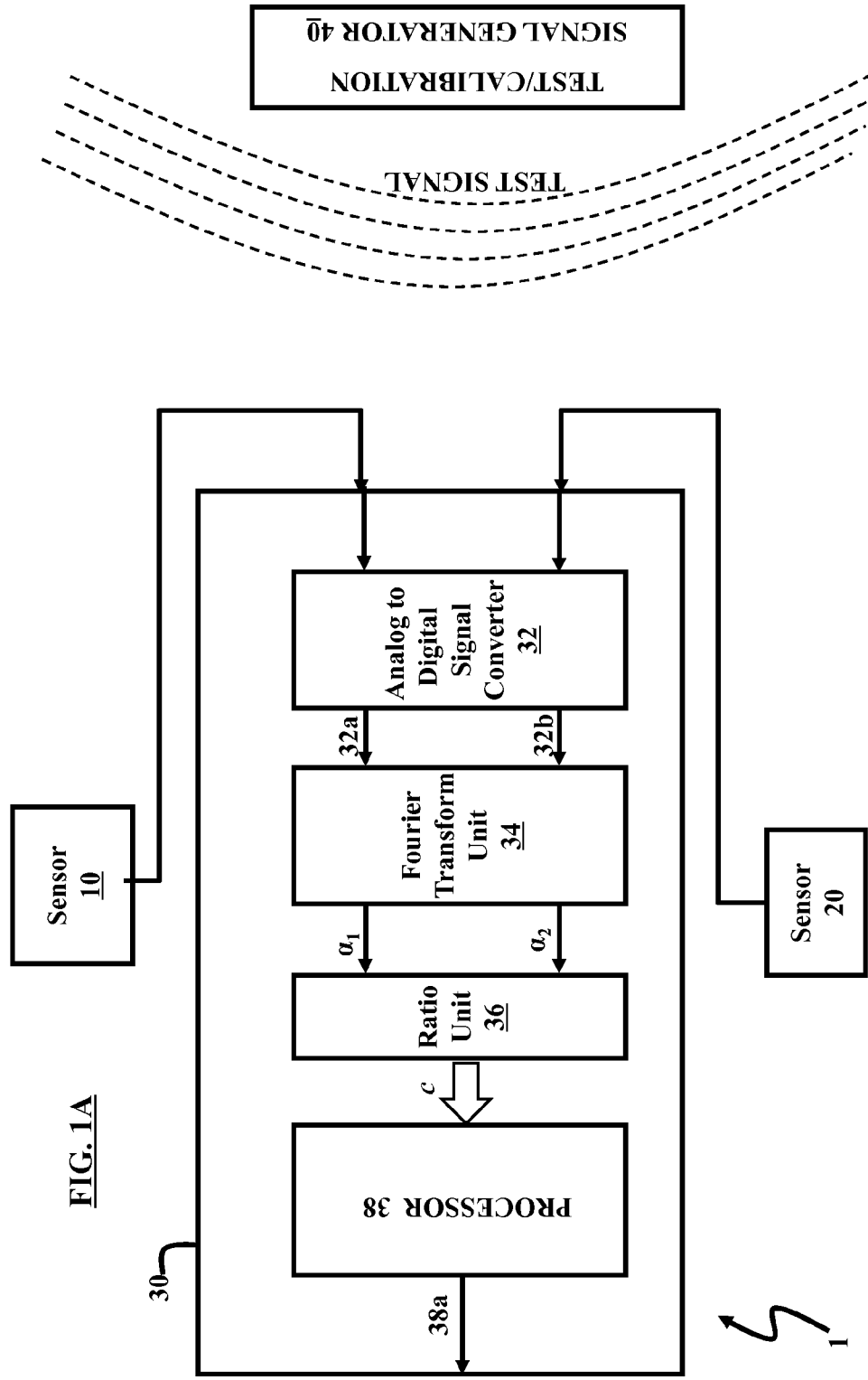
FIG. 1A illustrates a schematic diagram of a signal detection apparatus according to an embodiment herein comprising a signal generator 40.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second as photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a component that is farthest away.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein provide an improved magnetic sensing system capable of detecting specific frequencies in environments with excessive magnetic noise. Referring now to the drawings, and more particularly to FIGS. 1 through 4, where similar reference characters denote corresponding features consistently throughout the figures, there are shown preferred embodiments.

Figure 1B:
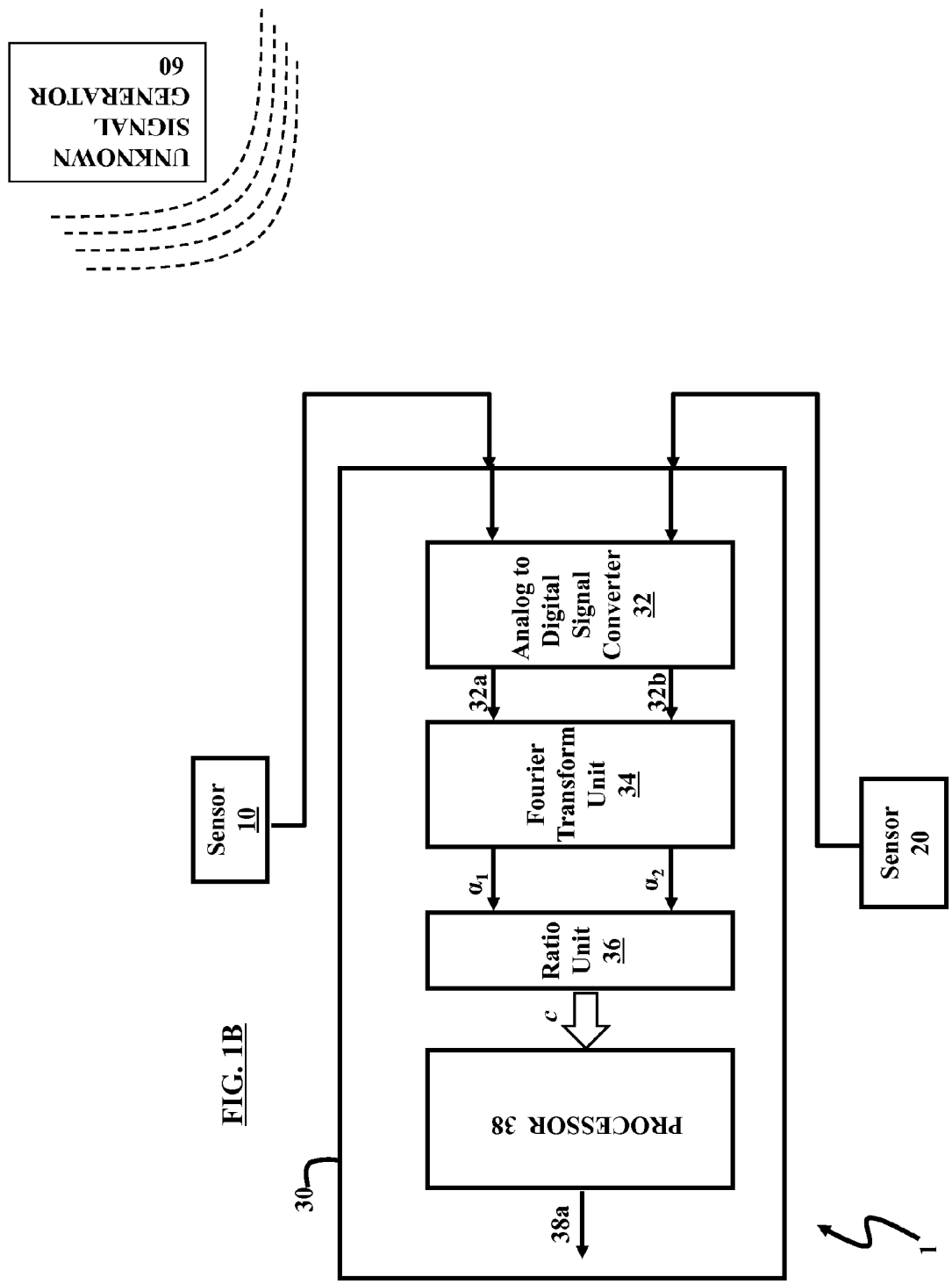
FIG. 1B illustrates a schematic diagram of a signal detection apparatus according to an embodiment herein illustrating an unknown signal generator 60.

FIG. 1A illustrates a schematic diagram of a signal detection apparatus 1 according to an embodiment herein comprising a test/calibration signal generator 40. FIG. 1A illustrates a schematic diagram of a signal detection apparatus 1 after calibration in an environment where there may be an unknown signal generator 60. As shown in FIGS. 1A and 1B, signal detection apparatus 1 includes a first sensor 10 and a second sensor 20. Also shown in FIGS. 1A and 1B is an assembly 30, which may include a signal converter 32, a Fourier transform unit 34, a ratio unit 36, and a processor 38. Although signal conversion unit 32, Fourier transform unit 34, and ratio unit 36, and processor 38 are shown in FIG. 1 as separate units housed within an assembly 30, those skilled in the art understand the components may be combined or arranged in alternative configurations within the scope of the present invention.

In FIG. 1A, a signal generator and/or coil 40 are situated an equal distance from first sensor 10 and second sensor 20. The signal generator and coil 40 are used to generate a magnetic field at a specified frequency $f_0$. Because of possible varying sensitivity, the input to sensor 10 is termed SIG1 and the input to sensor 20 is designated SIG2. The output from first sensor 10 and output from second sensor 20 are fed into signal processor 30 as separate input channels. In addition, the separate input channels of signal processor 30 (e.g., output from first sensor 10 and second sensor 20) are fed into signal converter 32. While not shown, signal converter 32 may include at least one analog-to-digital converter and may be configured as a two-channel analog-to-digital converter or two separate analog-to-digital converters (e.g., one analog-to-digital converter for each input source). The output of signal converter 32 may include two separate channels of digitized output (e.g., 32a and 32b), where in the digitized output is a discrete series of numeric values based on a continuous input (e.g., output from first sensor 10 or second sensor 20).

As further shown in FIG. 1A the two output channels of signal converter 32 (e.g., 32a and 32b) are subsequently fed into Fourier transform unit 34. Fourier transform unit 34 performs a Fourier transform operation on each output channel of signal converter 32 (e.g., 32a and 32b) to produce an amplitude of that channel at the specific frequency $f_o$ (e.g., $\alpha_1$ and $\alpha_2$). Alternatively, Fourier transform unit 34 may perform an approximation of a Fourier transform, such as a fast Fourier transform. The amplitude values produced by Fourier transform unit 34 (e.g., $\alpha_1$ and $\alpha_2$) are then fed into ratio unit 36. Ratio unit 36 produces the ratio of $\alpha_1$ to $\alpha_2$ (or $\alpha_1/\alpha_2$) as output at the specified frequency $f_o$. This ratio is denoted as c and provides the calibration for the sensors 10, 20. In other words, the ratio c accounts for the difference in sensitivity between the sensors 10, 20. The value c is stored for subsequent calculations such as in an environment depicted in FIG. 1B.

FIGS. 2(A) through 2(C), with reference to FIG. 1, illustrate a schematic diagram of a signal detection apparatus 1, coupled to a vehicle 40, according to an embodiment herein. In addition, another embodiment (not shown) of signal detection apparatus 1 is used in a stationary mode—i.e., signal detection apparatus 1 is not mobile. FIG. 2(A) illustrates signal detection apparatus 1, including sensor 10 and sensor 20, and detection target 60, such that signal detection apparatus 1 is positioned away from detection target 60. In this configuration, as described in further detail below, sensor 10 and sensor 20 record signals SIG1 and SIG2, respectively and perform a Fourier transforms of signals ($F_{SIG1}(f)$ & $F_{SIG2}(f)$) from detection target 60, where such signals include a signal at frequency $f_o$. Signal SIG1 is sent to a A/D converter and then a Fourier transform is performed on the signal and the amplitude $\alpha_{1f_o}$ at the frequency $f_o$ is determined. Similarly for the second sensor or receiver, the signal SIG2 received by sensor 2 is sent to a A/D converter and then a Fourier transform is performed on the signal and the resulting amplitude at $f_o$, is defined as $\alpha_{2f_o}$. The calibration procedure performed by the preferred embodiment system 1 defines c as $\alpha_{1fo}/\alpha_{2fo}$. The quantity c becomes a fixed constant after this calibration.

After the initial calibration that is used to determine c is completed, one may define the amplitudes $S_1$ and $S_2$ as corresponding to the amplitudes of the Fourier Transform of sensor 1 and sensor 2 at the frequency $f_o$, respectively. The difference S in the amplitudes of the Fourier transforms of the signals SIG1, SIG2 is defined by the equation $S=S_1-cS_2$ (Equation 1). This amplitudinal difference S (at the frequency $f_o$) will be zero everywhere except when one is near a source (e.g., target 60) emitting a signal that contains $f_o$. The difference in amplitudes S of the Fourier transforms will be either plus (when sensor 10 is closer to the source 60 than sensor 20), minus (when sensor 20 is closer to the source 60 than sensor 10), or zero (when the sensors 10, 20 are equidistance from the source 60 or when they are both a substantial distance away).

As is known in the art, the Fourier transform defines a relationship between a signal in the time domain and its representation in the frequency domain. S is the amplitude of the Fourier transform at the frequency $f_o$ in question.

When in motion (vehicle or target or both), for example, while coupled to a motor vehicle, the signals (SIG1, SIG2) from sensors 10 and 20 are measured as a function of time. As described in further detail below, while in motion, signal detection apparatus 1 again computes $S=S_1-cS_2$; the difference amplitudes after taking the Fourier transform. The amplitudinal difference S is non-zero as signal detection apparatus (vehicle 1) approaches a detection target 60 or visa-versa (as the target 60 approaches the apparatus 1) whenever the sensors 10, 20 are at different distances from the detection target 60. As stated previously, the constant c eliminates any difference in sensitivities of the sensors 10, 20. This interaction of sensors 10, 20 and detection target 60 while signal detection apparatus 1 is in motion (or while the target 60 is in motion or both) is described in further detail below with reference to FIGS. 2(B) and 2(C).

As shown in FIG. 2(B), signal detection apparatus 1 may be mounted on a vehicle 40. Vehicle 40 is shown in FIG. 2(B) on road 50, at position 43, heading towards detection target 60. Vehicle 40 is also shown in FIG. 2(C) on road 50, at position 46, near detection target 60. In FIGS. 2(B) and 2(C), vehicle 40 is moving in a linear direction (e.g., traveling forward on a road 50) towards detection target 60. First sensor 10 and second sensor 20 are shown in FIGS. 2(B) and 2(C) as being coupled to opposing sides of vehicle 40. For example, in FIGS. 2(B) and 2(C), first sensor 10 is coupled to a left side of vehicle 40 and second sensor 20 is coupled to a right side of vehicle 40, however the embodiments herein are not restricted to any particular placement of the sensors 10, 20 in relation to the vehicle 40. In addition, while signal detection apparatus 1 mounted on vehicle 40 in FIGS. 2(B) and 2(C), signal detection apparatus 1 is not limited to such a coupling and may, in general, be coupled to any mobile device or apparatus. Examples include, but are not limited to, all forms of terrestrial vehicles (either military or civilian), portable devices and handheld devices.

While not shown in FIGS. 2(A) through 2(C), first sensor 10 may produce a first signal and second sensor 20 may produce a second signal. First sensor 10 and second sensor 20 may produce signals SIG1 and SIG2 that are processed independently.

The combination of first sensor 10 and second sensor 20 together may operate as a gradiometer for measuring the difference between two signals (e.g., first signal and second signal), with an aim to facilitate rejection of common mode noise signals and improved reduction in errors due to sensor calibration at frequency $f_o$. The terminology "SIG1 and SIG2 has been used generically above; and both first sensor 10 and second sensor 20 may comprise magnetometers, in which case the signal that is being detected would be a magnetic field. The signal processing technique of the preferred embodiment may utilize sensors 10, comprising electric field sensors or, in addition, seismometers, or some other kind of electromagnetic field or acoustic sensor.

The output 38a of processor 38 (shown in FIG. 1) indicates whether signal detection apparatus 1 is near detection target 60. For example, the output 38a of processor 38 (shown in FIG. 1) may be zero when the signal detection apparatus 1 is unable to detect detection target 60 and the output 38a new signal generator 38 (shown in FIG. 1) may be non-zero when the apparatus 1 is able to detect detection target 60. The output 38a also detects whether sensor 10 or sensor 20 is closer to the target 60. If sensors 10 and 20 are equidistant from the target 60, then the output 38a would equal 0. Both signals $S_1$ and $S_2$ are larger when apparatus 1 is at position 46 compared to when apparatus 1 is at position 43.

As an example, signal detection apparatus 1 may be searching for detection target 60, which is known to emit a frequency $f_0$ at 60 Hz. In addition, one could scan the frequencies for detecting signals at other frequencies; other than 60 Hz. For example, if looking for an underground facility where an appliance (such as a fan) is present. Assuming most electrical products operate in the surveillance area operate at 60 Hz, by moving the detection apparatus around, variations above the background noise may be detected. Signal detection apparatus 1 uses first sensor 10 and second sensor 20 to capture signal information on either side of vehicle 40. In addition, the detection apparatus could be handheld and carried. In addition, only the sensors may be carried with provision being made for radioing signals receive by sensors 10, 20 to a base unit at a remote location. The signal information captured by each sensor (e.g., $S_1$ is captured from first sensor 10 and $S_2$ is captured from second sensor 20) is processed by signal processor 30, 38 (FIG. 1). Signal processor 38 takes the Fourier transform (e.g., by using Fourier transform unit 34) of the signal information captured by each sensor to produce amplitude values $\alpha_1$ and $\alpha_2$. Signal processor 38 then signal information by computing the amplitudinal difference $S=S_1-cS_2$ at frequency $f_0$, where c was calibrated and stored earlier as c using signal generator and coil 40, as described above. As a consequence of the above calculations performed by signal processor 30, signal detection apparatus 1 detects detection target 60, emitting a frequency $f_0$, when $S\neq 0$. If $S>0$, target 60 is closer to sensor 10, whereas if $S_c<0$, target 60 is closer to sensor 20.

Figure 3:
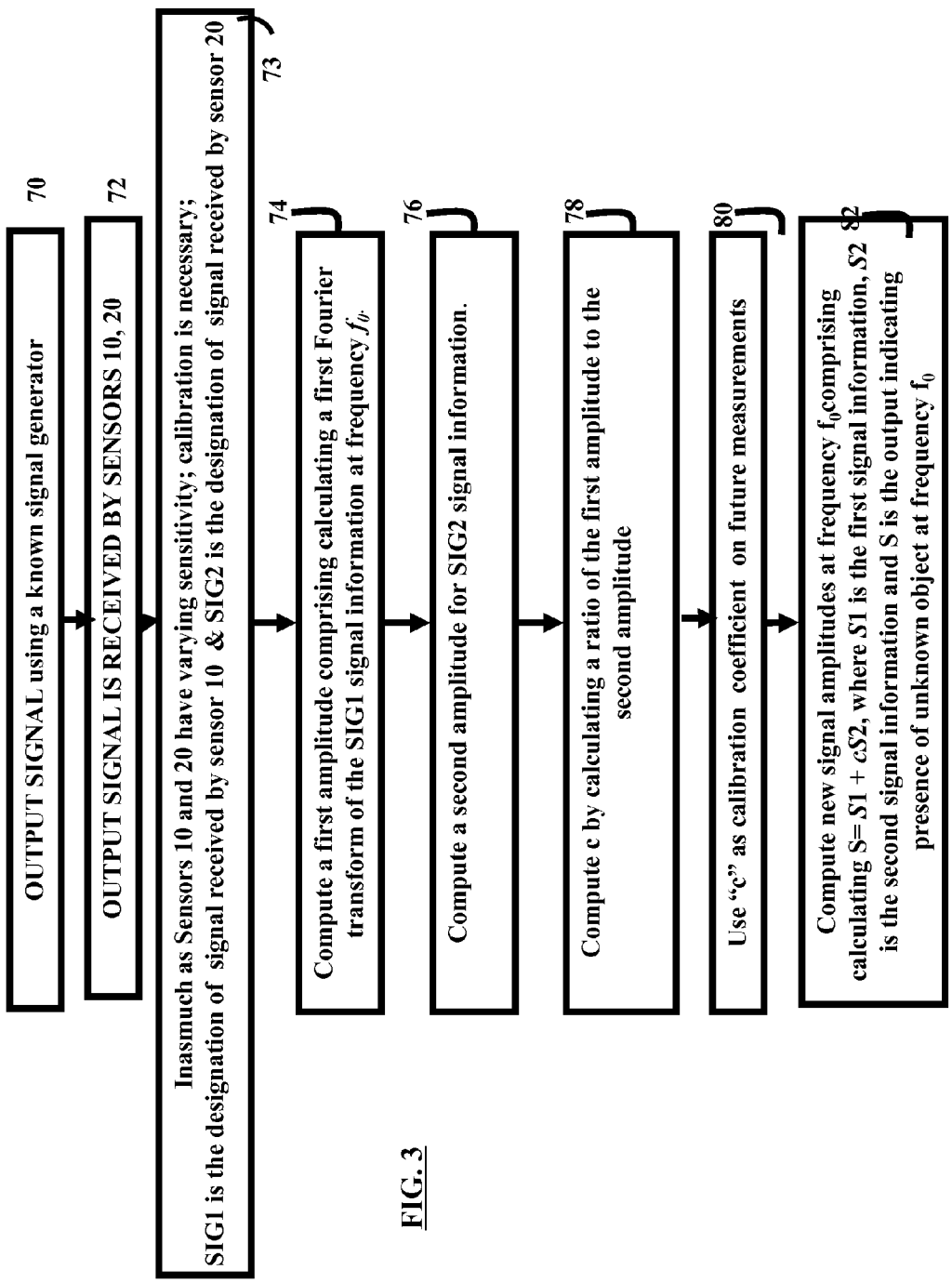
FIG. 3 is a flow diagram illustrating a preferred method according to an embodiment herein.

FIG. 3, with reference to FIGS. 1A, 1B, 2A, & 2(B), illustrates a flow diagram according to an embodiment herein. Generally, the process involves finding c using the signal generator and coil 40 and then using the sensors 10, 20 and c to determine $S_c$. Step 70, of the method shown in FIG. 3, describes outputting first signal information using a signal generator and coil (e.g., signal generator and coil 40). Step 72 describes receiving the signal information (e.g., via sensors 10, 20). Step 74 describes computing a first amplitude comprising calculating a first Fourier transform of the first signal information (e.g., via Fourier transform unit 34) at frequency $f_0$. Step 76 describes computing a second amplitude comprising calculating a second Fourier transform of the second signal information (e.g., via Fourier transform unit 34). Step 78 describes computing c as a ratio comprising calculating a ratio of the first amplitude to the second amplitude and negating a result of the calculation (e.g., via ratio unit 36). Step 80 describes using the computation at frequency $f_0$ of $S_1-cS_2$, where $S_1$ is the first signal information, $S_2$ is the second signal information and c is the inverse ratio (e.g., via new signal generator 38). In step 82, the method shown in FIG. 3, describes outputting the new signal (e.g., to create a spectrogram).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 4 illustrates a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 4 is a schematic drawing illustrates a hardware configuration of an information handling/computer system 100 for use with the embodiments herein. The system comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The Fourier transform of the signals from sensors 10 and 20 may be calculated. In general, Fourier transform X(f) is composed of a real and imaginary function. The real function is $x_r(f)$ and the imaginary function is $x_i(f)$. Thus, x(f) is given by $$X(f) = x_r(f) + ix_i(f)$$

To determine the amplitude, these functions are evaluated at the frequency $f_0$, the functions are squared and summed together. By taking the square root of the sum, the amplitude is derived, which is measure of the signal strength at the frequency $f_0$.

The foregoing description of the specific embodiments are intended to reveal the general nature of the embodiments herein. While others can, by applying current knowledge, readily modify and/or adapt for various applications; it is not intended that such specific embodiments be interpreted as departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for detecting signal information at a predetermined frequency
comprising:
a processor;
a first sensor mounted at a first location operatively connected to the processor;

a second sensor mounted at a second location operatively connected to the processor;

the processor operating to compute the amplitudes of the first and second Fourier transforms of the outputs of the first and second sensors, respectively, the difference in the amplitudes of the first and second Fourier transforms being determinative of the existence of a signal being generated at the predetermined frequency.

2. The system of claim 1 further comprising a vehicle and wherein the first, sensor comprises a first magnetometer and the second sensor comprises a second magnetometer; and wherein the first magnetometer is coupled to a first side of a vehicle and the second magnetometer is coupled to a second side of a vehicle and wherein the signal being generated at the predetermined frequency is an unidentified object.

3. The system of claim 1 wherein the processor comprises a Fourier transform unit that computes the amplitude of the Fourier transforms of the outputs of the first and second sensors around the predetermined frequency $f_0$.

4. The system of claim 3, wherein said processor comprises a ratio unit coupled to said Fourier transform unit for computing a ratio of the amplitudes of the outputs of the first and second sensors around the predetermined frequency $f_0$.

5. The system of claim 4, wherein the processor computes an amplitude S1 of the output of the first sensor, and amplitude S2 of the output of the second sensor and c, which is the ratios of S1/S2 whereby c becomes calibration constant.

6. The system of claim 1 further comprising a test signal generator that emits a signal at the predetermined frequency and is positioned symmetrically relative to the first and second sensors and wherein the processor computes a sensitivity of said first and second sensors using the signal generator and stores the computation as a calibration constant.

7. The system of claim 1 wherein the processor computes the amplitudes of the first and second Fourier transforms S1 and S2 of the outputs of the first and second sensors and determines a constant c from the ratio between S1 and S2, and wherein the processor may detect a known or unknown object at the specific frequency when the calculation $S_1 - cS_2$ produces a non-zero value, and wherein an object is not detected when $S_1 - cS_2$ produces a zero value.

8. The system of claim 7 wherein the sensors are first and second magnetometers, and wherein the system is programmed such that when $S_1 - cS_2$ is greater, than zero, the system indicates that the source of the signal information is emitting the signal information closer to the first magnetometer compared to the second magnetometer, and wherein when $S_1 - cS_2$ is less than zero, the system indicates that the source is emitting the fixed frequency closer to the second magnetometer, and wherein when both $S_1$ and $S_2$ increase, and the computation $S_1 - cS_2$ is near zero, the system indicates, that the source is, emitting from a location that is equidistant the first magnetometer and the second magnetometer.

9. An apparatus for detecting an object emitting a specific frequency in an environment with magnet noise also being emitted at said specific frequency, said apparatus comprising:
a processor;
a first sensor mounted at a first location operatively connected to the processor;
a second sensor mounted at a second location operatively connected to the processor;
the processor operating to compute the amplitudes of the first and second Fourier transforms of the outputs of the first and second sensors, respectively, the difference in the amplitudes of the first and second Fourier transforms being determinative of the existence of a signal being generated at the predetermined frequency.

10. The apparatus of claim 9 further comprising a gradiometer, the first sensor comprising a first magnetometer outputting first signal information and the second sensor comprising a second magnetometer outputting second signal information; and the processor processing the first signal information and the second signal information and computing a first Fourier transform of the first information signal and a second Fourier transform of the second information signal.

11. The apparatus of claim 10, wherein the processor determines a first amplitude from the first Fourier transform of the first information signal and a second amplitude from the second Fourier transform of the second information signal at the specified frequency.

12. The apparatus of claim 11, wherein the processor calculates a ratio of the first amplitude and the second amplitude at the specified frequency.

13. The apparatus of claim 12, wherein the processor computes S1−cS2, where S1 is, derived from the first signal information, S2 is derived from the second signal information, and c is fixed constant calculated from the ratio between S1 and S2 at the specified frequency.

14. A method of detecting the existence of an object emitting a signal at a specified frequency in an environment with magnet noise at the specified frequency, said method comprising:
generating a known signal at a specified frequency;
receiving the signal at first and second spaced apart sensors, the first and second sensors producing first and second Signal information respectively;
computing a first amplitude comprising calculating a first Fourier transform of said first signal information;
computing a second amplitude comprising calculating a second Fourier transform of said second signal information;
computing and storing a ratio comprising the ratio of said first amplitude to said second amplitude;
using the ratio of the first amplitude to the second amplitude as a calibration constant c;
detecting the presence or absence of objects emitting signals at the specified frequency by computing the amplitude difference between the first and second Fourier transforms based upon first and second signal information using the stored ratio;
whereby a positive amplitude difference indicates the presence of an object emitting a signal at a position nearest one of the first or second sensor and a negative difference indicates the presence of an object nearest the other of the first or second sensor.

15. The method of claim 14, wherein when the amplitude difference is zero no signal is detected at the specified frequency.

16. The method of claim 15, wherein the first sensor comprises a first magnetometer and the second sensor comprises a second magnetometer.

17. The method of claim 16, wherein when the difference in amplitudes is greater than zero, the object is emitting a signal at the specified frequency closer to said first magnetometer compared to said second magnetometer, and wherein when the difference in amplitudes is less than zero, the object emitting a signal at the specified frequency is closer to the second magnetometer compared to the first magnetometer, and wherein when both amplitudes increase and the difference is approximately zero, the object emitting the specified frequency is not in close proximity to the first magnetometer and the second magnetometer.

18. The method of claim 17, wherein said first magnetometer and said second magnetometer are components of a gradiometer.

19. The method of claim 17, wherein the signal information is captured over a period of time.

20. The method of claim 15 further including a frequency scanner and whereby the method is performed at a set frequency within a range of frequencies; each of the predetermined frequencies being scanned to determine results for the specified frequency and upon obtaining the results at that specified frequency, the frequency is increased or decreased to obtain results at the next frequency within the scanning range.

* * * * *